US006876810B2

United States Patent
Morimoto et al.

(10) Patent No.: US 6,876,810 B2
(45) Date of Patent: Apr. 5, 2005

(54) VARIABLE OPTICAL ATTENUATOR

(75) Inventors: Masahito Morimoto, Tokyo (JP); Kouki Sato, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 299 days.

(21) Appl. No.: 10/011,143

(22) Filed: Nov. 9, 2001

(65) Prior Publication Data

US 2002/0110347 A1 Aug. 15, 2002

(30) Foreign Application Priority Data

Feb. 15, 2001 (JP) ........................................ 2001-038545

(51) Int. Cl.[7] .................................................. G02B 6/00
(52) U.S. Cl. ..................................................... 385/140
(58) Field of Search ........................... 385/140, 19, 23, 385/25

(56) References Cited

U.S. PATENT DOCUMENTS

| | | | | |
|---|---|---|---|---|
| 5,541,607 A | * | 7/1996 | Reinhardt | 342/372 |
| 5,745,634 A | * | 4/1998 | Garrett et al. | 385/140 |
| 5,900,983 A | * | 5/1999 | Ford et al. | 385/140 |
| 5,923,798 A | * | 7/1999 | Aksyuk et al. | 385/19 |
| 5,995,688 A | * | 11/1999 | Aksyuk et al. | 385/14 |
| 6,075,239 A | * | 6/2000 | Aksyuk et al. | 385/16 |
| 6,173,105 B1 | * | 1/2001 | Aksyuk et al. | 385/140 |
| 6,246,826 B1 | * | 6/2001 | O'Keefe et al. | 385/140 |
| 6,636,657 B1 | * | 10/2003 | Aksyuk et al. | 385/140 |

OTHER PUBLICATIONS

Giles, et al., A silicon MEMS Optical Switch Attenuator and Its Use in Lightwave Subsystems, *IEEE J. of Selected Topics in Quantum Electronics* 5(1):18–25 (1999).

* cited by examiner

Primary Examiner—Zandra V. Smith
Assistant Examiner—Juan D Valentin, II
(74) Attorney, Agent, or Firm—Oblon, Spivak, McClelland, Maier & Neustadt, P.C.

(57) ABSTRACT

An optical attenuator has first and second lenses provided individually on the respective end faces of first and second optical fibers that are opposed to each other across a space, and a shutter plate interposed between the lenses. The distance between the shutter plate and the second lens and a mode-field radius of propagating light on the second-lens-side surface of the shutter plate are set so that the respective signs of the real and imaginary parts of an evaluation function, representing a diffraction pattern of the propagating light that propagates from the first optical fiber to the second optical fiber, are inverted 60 times or more when a variable of the evaluation function is changed within an evaluation range.

15 Claims, 8 Drawing Sheets

VARIABLE OPTICAL ATTENUATOR

BACKGROUND OF THE INVENTION

1. Field of the Invention

The present invention relates to an optical attenuator, and more particularly, to a variable optical attenuator for optical communication.

2. Related Art

In optical communication, e.g., in wavelength-division multiplexing (WDM) transmission, a variable optical attenuator is used to adjust the intensity level of light to an appropriate range.

FIG. 8 shows an example of the variable optical attenuator, which comprises a shutter plate 21. The shutter plate 21 is located for movement in a direction (X-direction) across the optical path of an optical fiber 3. As the shutter plate 21 moves, the amount of light obscuration changes. This arrangement is described in IEEE Journal of Selected Topics in Quantum Electronics, Vol. 5, No. 1, January/February 1999, pp. 18–25.

As mentioned before, some variable optical attenuators are used for WDM transmission. The variable optical attenuators for WDM transmission are expected to be able to achieve optical attenuation of 30 dB or more, suffer only a small polarization-dependent loss, stand high optical input power, and be small-sized.

It is hard for the variable optical attenuators shown in FIG. 8 to meet the above requirements for the following reason.

In the variable optical attenuator shown in FIG. 8, a diffraction pattern that is formed on the light receiving end face of the optical fiber spreads over an area wider than the fiber end face, owing to diffraction by means of the shutter plate 21. Since the reflectance of light incident upon the outer peripheral edge portion of the optical fiber end face varies depending on the direction of polarization, furthermore, a polarization-dependent loss is caused.

SUMMARY OF THE INVENTION

The object of the present invention is to provide an optical attenuator suffering only a small polarization-dependent loss and capable of attaining a given amount of optical attenuation, resisting high optical input power, and being downsized.

According to the present invention, there is provided an optical attenuator, which comprises a first optical component, a second optical component opposed to the first optical component across a space, a shutter plate for intercepting at least part of propagating light propagating from the first optical component to the second optical component, a first lens provided on a light-connecting end face of the first optical component, and a second lens provided on a light-connecting end face of the second optical component.

In the optical attenuator of the invention, the distance between the shutter plate and the second lens and a mode-field radius of the propagating light on the second-lens-side surface of the shutter plate is set so that the respective signs of the real and imaginary parts of an evaluation function, representing a diffraction pattern of the propagating light as a function of at least the distance and a coordinate value in a coordinate system set in the optical attenuator, are inverted a given number of times settled depending on required properties for the optical attenuator or more frequently when the coordinate value, serving as a variable of the evaluation function, is changed within an evaluation range defined according to at least the mode-field radius.

According to the invention, the optical attenuator can be constructed so that the distance $z$ between the shutter plate and the second lens and the mode-field radius $r$ have appropriate values. Thus, the polarization-dependent loss of the optical attenuator can be lessened so that the light transmission characteristic can be restrained from being lowered by the polarization-dependent loss. Since the optical attenuator of the invention, unlike the one that uses a light absorbing film, attenuates light by means of the shutter plate, moreover, it can stand high optical input power and be small-sized.

DETAILED DESCRIPTION

The following is a description of a feature of the present invention such that the polarization-dependent loss can be lessened by properly setting the distance $z$ and mode-field radius $r$.

Figure 8:
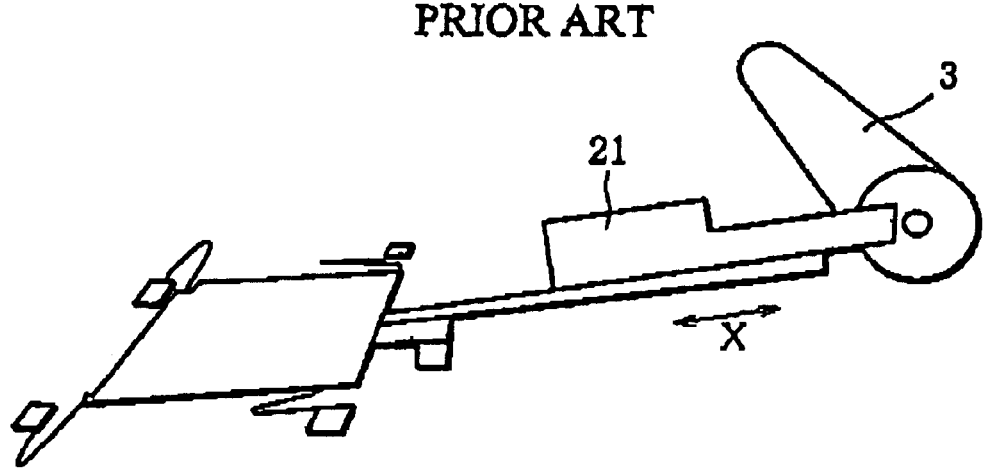
FIG. 8 is a view illustrating an example of the conventional variable optical attenuator.

The inventor hereof conducted an experiment for measuring the polarization-dependent loss for the optical attenuator of the type shown in FIG. 8. Thereupon, the inventor found that the polarization-dependent loss increased as the amount of light obscuration by a shutter plate increased, and concluded that this is because the symmetry of a diffraction pattern (optical mode field shape based on diffraction attributable to light obscuration) of the propagating light is ruined considerably and the optical power is lowered as the amount of light obscuration increases. The following is a description of the reason for this conclusion.

The inventor hereof examined factors that influence the symmetry of the optical mode field shape and the polarization-dependent loss, originally recognizing that the optical mode field shape can be represented by a Fresnel-Kirchhoff integral given by $$E(x,y,z,L) \approx 1 \cdot i \cdot (1/\lambda \cdot z) \cdot \exp[-1 \cdot i \cdot (2\pi/\lambda) \cdot z] \cdot \int_L{}^a \int_{-a}{}^a E0(x0,y0) \cdot \exp[-1 \cdot i \cdot (2\pi/\lambda) \cdot \{(x-x0)^2 + (y-y0)^2\}/2z]] dx0 dy0. \quad (1)$$

Figure 3:
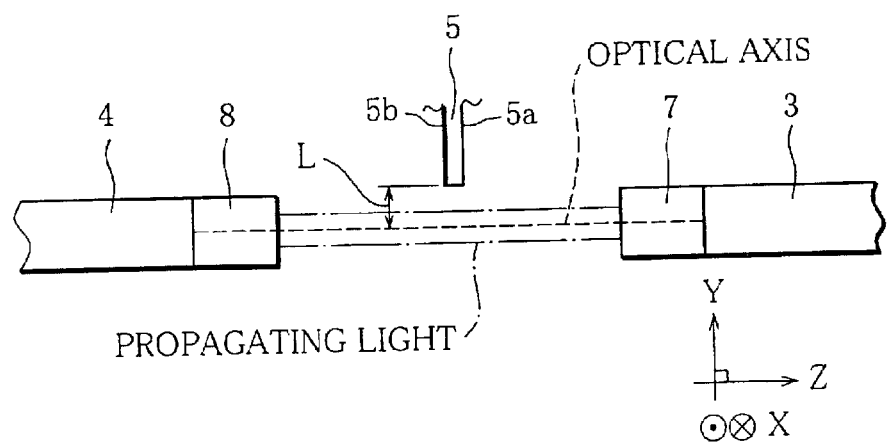
FIG. 3 is a view showing the relationship between propagating light and a shutter plate in the variable optical attenuator shown in FIG. 1.

E(x, y, z, L) on the left side of expression (1) represents an electric field on coordinates (x, y, z) in an XYZ coordinate system set in the optical attenuator for the case where a shutter plate 5 is located so that its Y-direction distance from the optical axis of the propagating light is L, as shown in FIG. 3. The XYZ coordinate system is set so that its coordinate origin (x0, y0, z0) is coincident with the point of intersection of the centerline of the optical axis and a plane that contains a second-lens-side face (hereinafter referred to as second surface) 5b of the shutter plate 5.

On the right side of expression (1), E0 and λ represent an electric field on the coordinate origin (x0, y0, z0) and the wavelength of the propagating light, respectively. Further, z and 1·i represents the distance between the light-receiving end face of a second lens 8 and the second surface 5b of the shutter plate 5, and 1·i represents an imaginary unit.

The right side of expression (1) is equal to the product of the first term, represented as a function of the wavelength λ of the propagating light and the distance z between the shutter plate and the second lens, and the second term that is an integral of an integrand. The integrand includes the phase term $\exp[-1 \cdot i \cdot (2\pi/\lambda) \cdot [\{(x-x0)^2 + (y-y0)^2\}/2z]]$, which is an exponential function represented as a function of wavelength λ, distance z, and x- and y-coordinates.

In order to obtain an evaluation function that is to be used for the evaluation of the diffraction pattern (optical mode field shape) of the propagating light near the optical axis, the phase term of expression (1) is transformed as follows:

$$\exp\{-j \cdot (2\pi/\lambda) \cdot (t^2/2z)\}. \quad (2)$$

Expression (2) can be obtained by substituting j for the imaginary unit $(-1)^{0.5}$, reducing the variable (x−x0) or (y−y0) ((x−x0) in the present embodiment) in expression (1) to 0, and representing another variable by t. In other words, in the present embodiment, the diffraction pattern is evaluated according to evaluation function values that are obtained when the variable t in the phase term is changed on the Y-axis.

Since a light source that generates Gaussian beams is used in the present embodiment, a requirement that the propagating light should be a Gaussian beam is fulfilled. A beam radius such that the beam intensity is equal to 1/e of the center beam intensity will be referred to as mode-field radius r hereinafter. In the case of the Gaussian beam, the intensity of beams in an outside beam region outside the range of radii about five times as long as the mode-field radius r can be regarded as nearly zero, so that the value of the variable t in the phase term is changed within the range (evaluation range) of −5r to 5r in calculating the evaluation function values (real and imaginary parts of the phase term).

Then, the inventor hereof concluded from the result of calculation of the evaluation function values that the symmetry of the optical mode field shape (diffraction pattern) with respect to the optical axis is ruined when the respective frequencies of sign inversion of the real and imaginary parts of the phase term are lower than a given number of times (e.g., 60 times), and that it becomes nearly rotationally symmetrical when frequencies of sign inversion are not lower than the given number of times.

More specifically, the diffraction pattern of the propagating light is equivalent to the sum of the real and imaginary parts of the phase term throughout the range of change (−5r≦t≦5r) of variables t. If the respective frequencies of sign inversion of the real and imaginary parts of the phase term within the aforesaid range are high, then the real and imaginary parts of the phase term can be supposed drastically to change in a vibrating manner with respect to the optical axis as the Y-direction position of the objective point of calculation changes. If the phase term (field intensity) thus changes vibratingly, it is equalized in the aforesaid range of change, so that the diffraction pattern is believed to become substantially symmetrical with respect to the optical axis. If the respective frequencies of sign inversion of the real and imaginary parts of the phase term are too low, on the other hand, the field intensity becomes uneven in the aforesaid range, so that the rotational symmetry of the diffraction pattern is supposed to be ruined.

Then, the inventor hereof examined the relationship between the symmetry of the diffraction pattern and the polarization-dependent loss in the following manner.

As mentioned before, the degree of symmetry of the diffraction pattern changes according to the respective frequencies of sign inversion of the real and imaginary parts of the phase term in expression (2) as the variable in the phase term changes within the given range. Further, the phase term changes depending on the wavelength λ of the propagating light and the distance z between the shutter plate and the second lens, and the range of calculation of the phase term (evaluation range of the evaluation function) is defined by the mode-field radius r.

The inventor hereof recognized that the aforesaid frequencies of sign inversion change mainly depending on the distance z and the mode-field radius r (more specifically, on the relative positions of the first and second optical components, first and second lenses, and shutter plate, the type of the light source, and the respective focal lengths of the first and second lenses). Based on this recognition, the inventor manufactured a large number of optical attenuators that include different components and lenses with different focal lengths and have different frequencies of sign inversion, and measured the polarization-dependent loss of each optical attenuator. Then, the relationship between the frequency of sign inversion (degree of symmetry of the diffraction pattern) and the polarization-dependent loss was examined.

In consequence, it was found that the polarization-dependent loss with 30-dB optical attenuation, for example, can be reduced to about 0.7 dB or less in the case where the frequency of sign inversion is 60 times or more. Since the polarization-dependent loss tends to increase with the increase of the amount of optical attenuation, it can be made lower than about 0.7 dB if the amount of optical attenuation is smaller than 30 dB.

As mentioned before, the inventor hereof recognized influences of the respective frequencies of sign inversion of the real and imaginary parts of the phase term upon the polarization-dependent loss and, based on this recognition, created an optical attenuator in which the distance $\underline{z}$ between the shutter plate and the second lens and the mode-field radius $\underline{r}$ of the propagating light are set so that the frequencies of sign inversion are not lower than the given number of times.

The evaluation function that is used to settle the distance $\underline{z}$ and the mode-field radius $\underline{r}$ will be summed up. Basically, this evaluation function is a phase term that is included in the integrand in the Fresnel-Kirchhoff integral of expression (1) that represents the optical mode field shape. This phase term is an exponential function that is represented as a function of the wavelength λ, distance $\underline{z}$, and a coordinate value in the coordinate system set in the optical attenuator. Preferably, the evaluation function is the phase term of expression (2), which is an exponential function that is represented as a function of a position $\underline{t}$ on a coordinate axis (Y-axis) perpendicular to the optical axis in the coordinate system in the optical attenuator, wavelength λ, and distance $\underline{z}$.

The optical attenuator of the present invention can attain a high amount of optical attenuation, reduce the polarization-dependent loss, be downsized, and resist high optical input power, so that it is applicable to various purposes. In particular, the polarization-dependent loss with 30-dB optical attenuation can be restricted to about 0.7 dB if the distance $\underline{z}$ and the mode-field radius $\underline{r}$ are set so that the frequency of sign inversion is not lower than 60 times. Thus, the optical attenuator of the invention is suitable for use as an optical attenuator for WDM system that is subject to strict requirements. If the distance $\underline{z}$ and the mode-field radius $\underline{r}$ are set so that the frequency of sign inversion is not lower than 100 times, moreover, the polarization-dependent loss with 30-dB optical attenuation can be further reduced to about 0.2 dB or less.

Preferably, in the present invention, at least one of the first and second lenses is formed of a lens-type optical fiber including a lens mechanism and is connected to the light-connecting end face of the first or second optical component corresponding thereto. According to this aspect, the loss of optical connection between at least one of the two lenses and an optical component corresponding thereto can be reduced.

Preferably, the respective light-connecting end portions of the first and second optical components and the first and second lenses are fixed on a semiconductor substrate. According to this aspect, the respective optical axes of the first and second optical components can be easily accurately aligned with those of the first and second lenses corresponding thereto, and the optical attenuator can be made small-sized.

Preferably, at least one of the first and second optical components is formed of an optical fiber. According to this aspect, the optical attenuator and an external optical component can be connected with high efficiency.

The following is a description of a variable optical attenuator according to a first embodiment of the present invention.

Figure 1:
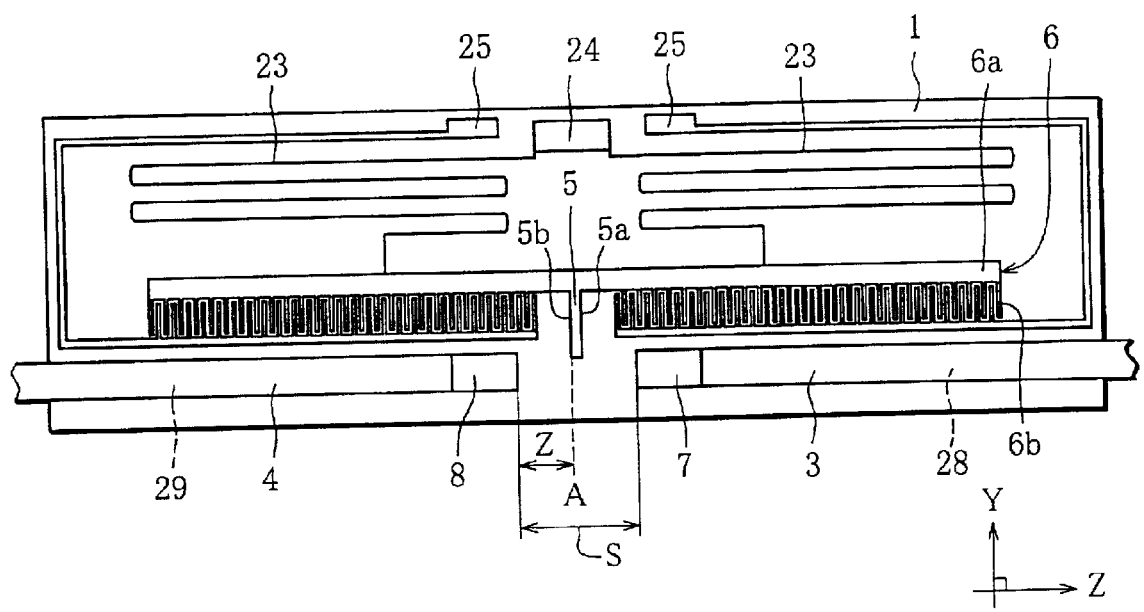
FIG. 1 is a schematic plan view of a variable optical attenuator according to a first embodiment of the present invention.

As shown in FIG. 1, the variable optical attenuator of the present embodiment comprises a semiconductor substrate such as a silicon substrate 1 that is formed with V-grooves 28 and 29. A first lens 7 and a first optical component that is formed of a first optical fiber 3 are fixed to the V-groove 28, while a second lens 8 and a second optical component that is formed of a second optical fiber 4 are fixed to the V-groove 29. The second optical fiber 4 is opposed to the first optical fiber 3 with a space in the direction of an optical axis Z between them.

Each of the first and second optical fibers 3 and 4 is formed of a single-mode optical fiber. Each of the lenses 7 and 8 is formed of a lens-type optical fiber having a lens mechanism, e.g., a graded-index optical fiber of an all-core type with normal refractive index distribution. As shown in FIG. 3, the lenses 7 and 8 emit incident light in the form of parallel light.

The first lens 7 and the first optical fiber 3 are connected to each other by fusion splicing on a light-connecting end face of the first optical fiber 3, thereby forming a first optical fiber collimator. The second lens 8 and the second optical fiber 4 are connected to each other by fusion splicing on a light-connecting end face of the second optical fiber 4, thereby forming a second optical fiber collimator.

Propagating light that propagates from the first optical fiber collimator to the second optical fiber collimator is formed of a substantially parallel Gaussian beam with the diameter of about 75 μm. In other words, light from a light source that can generate Gaussian beams is landed on the optical fiber collimators, and the length and refractive index characteristic of the collimator or the focal length of the collimator is settled so that the diameter of the Gaussian beam is about 75 μm. The inter-collimator distance (space S between the first and second lenses 7 and 8 in the direction of the optical axis Z) for the best coupling efficiency that is calculated according to a ray matrix is about 990 μm. According to the present embodiment, however, the space S is set at 200 μm. In the case where the incident light is collimated into parallel light by means of a lens in the aforesaid manner, a very great axial dislocation in the direction of the optical axis is allowed, so that an increment in loss that is attributable to the space S of 200 μm, not the optimum value 990 μm, is only about 0.1 dB.

Referring again to FIG. 1, the variable optical attenuator of the present embodiment comprises a shutter plate 5, which intercepts at least part of the propagating light that propagates from the first optical fiber 3 to the second optical fiber 4, and a comblike actuator 6 that includes a movable comb-tooth portion 6a and a fixed comb-tooth portion 6b. The shutter plate 5 is coupled to the movable comb-tooth portion 6a, which is connected to a bonding pad 24 by means of a spring (beam) 23. The comb-tooth portion 6b of the actuator 6 is connected to a bonding pad 25. A voltage applying element (not shown) is connected to the bonding pads 24 and 25.

The shutter plate 5, which is located over the silicon substrate 1, can move integrally with the movable comb-tooth portion 6a in the direction of a Y-axis in FIG. 1. Thus, the shutter plate 5, comblike actuator 6, and spring 23 are formed on the surface of the silicon substrate 1 with a victim layer (not shown) between them by the well-known micromachining technique (semiconductor micromachining technique), and the victim layer is then removed by etching using an organic solvent or the like, whereupon the shutter plate 5 is lifted above the silicon substrate 1.

In the arrangement described above, the shutter plate 5 is caused to move in the direction of the Y-axis with respect to the optical axis of the propagating light by means of electrostatic force that is generated as the actuator 6 is supplied with voltage from the voltage applying element (not shown), whereby the amount of optical attenuation by means of the shutter plate 5 is changed.

The shutter plate 5 has first and second surfaces 5a and 5b that are opposed to the first and second lenses 7 and 8, respectively. In the present embodiment, a distance $z$ between the second surface 5b of the shutter plate 5 and the second lens 8 is adjusted to 100 $\mu$m. As mentioned before, the propagating light is formed of the substantially parallel Gaussian beam with the diameter of about 75 $\mu$m, so that a mode-field radius $r$ of the propagating light on the second surface 5b of the shutter plate 5 (or the radius of the propagating light obtained when the propagating light is cut in the position indicated by broken line A in FIG. 1) is 37.5 $\mu$m. Further, a wavelength $\lambda$ of the propagating light is 1,550 nm.

The distance $z$ and the mode-field radius $r$ are set at the aforesaid values (z=100 $\mu$m, r=37.5 $\mu$m), individually. These set values are based on the result of evaluation that uses the phase term, $\exp\{-j\cdot(2\pi/\lambda)\cdot(t^2/2z)\}$ in the evaluation function or expression (2). As is evident from the above description, in this case, the respective signs of the real and imaginary parts of the phase term should be inverted a given number of times, e.g., 60 times or more, when a variable $t$ of the phase term is changed within the range of evaluation.

Figure 2:
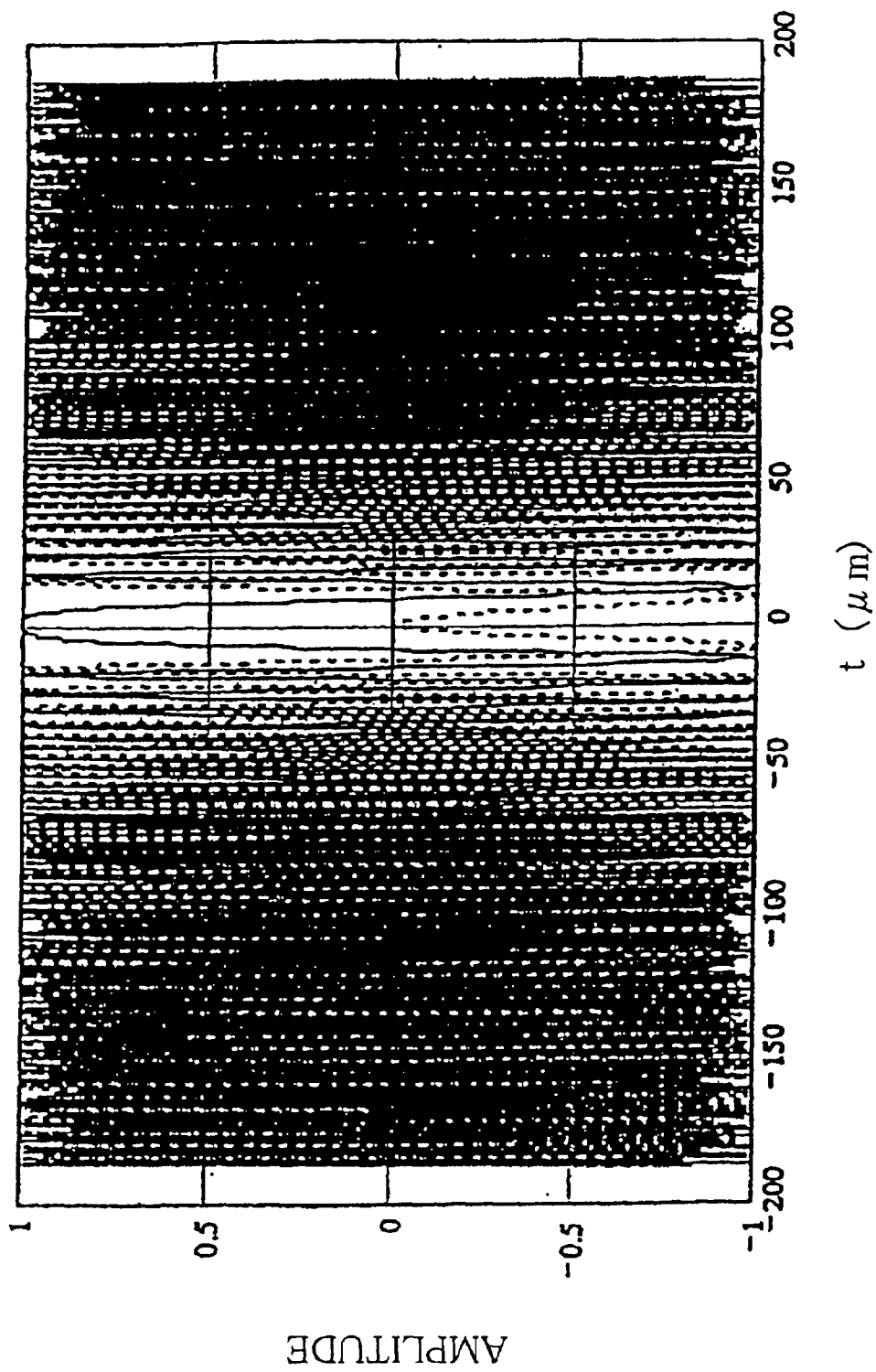
FIG. 2 is a graph showing the relationship between the amplitude of an evaluation function (phase term included in an integrand in a Fresnel-Kirchhoff integral) for diffraction pattern evaluation and a distance $t$ from the coordinate origin, in the variable optical attenuator shown in FIG. 1.

To confirm this, the respective amplitudes of the real and imaginary parts of the phase term for various variables were calculated, while changing the variable $t$ within the range from −5r (−5×37.5 $\mu$m) to 5r (5×37.5 $\mu$m). FIG. 2 shows the result of the calculation. The respective frequencies of sign inversion of the real and imaginary parts exceeded a hundred times by a margin of tens of times, as indicated by full and broken lines, respectively.

In the variable optical attenuator of the present embodiment, as described above, the distance $z$ and the mode-field radius $r$ are set so that the respective frequencies of sign inversion of the real and imaginary parts of the phase term exceed a hundred times by tens of times, and the distance and the mode-field radius are adjusted to the values $z$ and $r$, respectively. Therefore, the polarization-dependent loss is very small. According to a measurement, the polarization-dependent loss with 30-dB optical attenuation was 0.1 dB or less. Thus, the variable optical attenuator of the present embodiment is adapted for use as a variable attenuator for a wavelength-division multiplexing transmission system, for example.

Unlike the conventional variable optical attenuator shown in FIG. 8, the variable optical attenuator of the present embodiment uses no light absorbing film, so that it can resist high optical input power. Since the shutter plate 5, comblike actuator 6, spring 23, etc. are formed on the silicon substrate 1 by the semiconductor micromachining technique, the variable optical attenuator can be reduced in size, and the actuator 6 can accurately move the shutter plate 5 by means of electrostatic force, thereby accurately adjusting the amount of optical attenuation. Since the first and second optical fibers 3 and 4 and the first and second lenses 7 and 8 are fixed in the V-grooves 28 and 29 of the silicon substrate 1, furthermore, the respective optical axes of the optical fibers 3 and 4 can be aligned easily and accurately.

The inventor hereof examined the respective frequencies of sign inversion of the real and imaginary parts of the phase term for the prior art variable optical attenuator shown in FIG. 8. In the prior art example, the mode-field radius for the shutter plate is calculated as about 6 $\mu$m, so that the values of the phase term was obtained by changing the variable $t$ from −5×6 $\mu$m to 5×6 $\mu$m.

Figure 9:
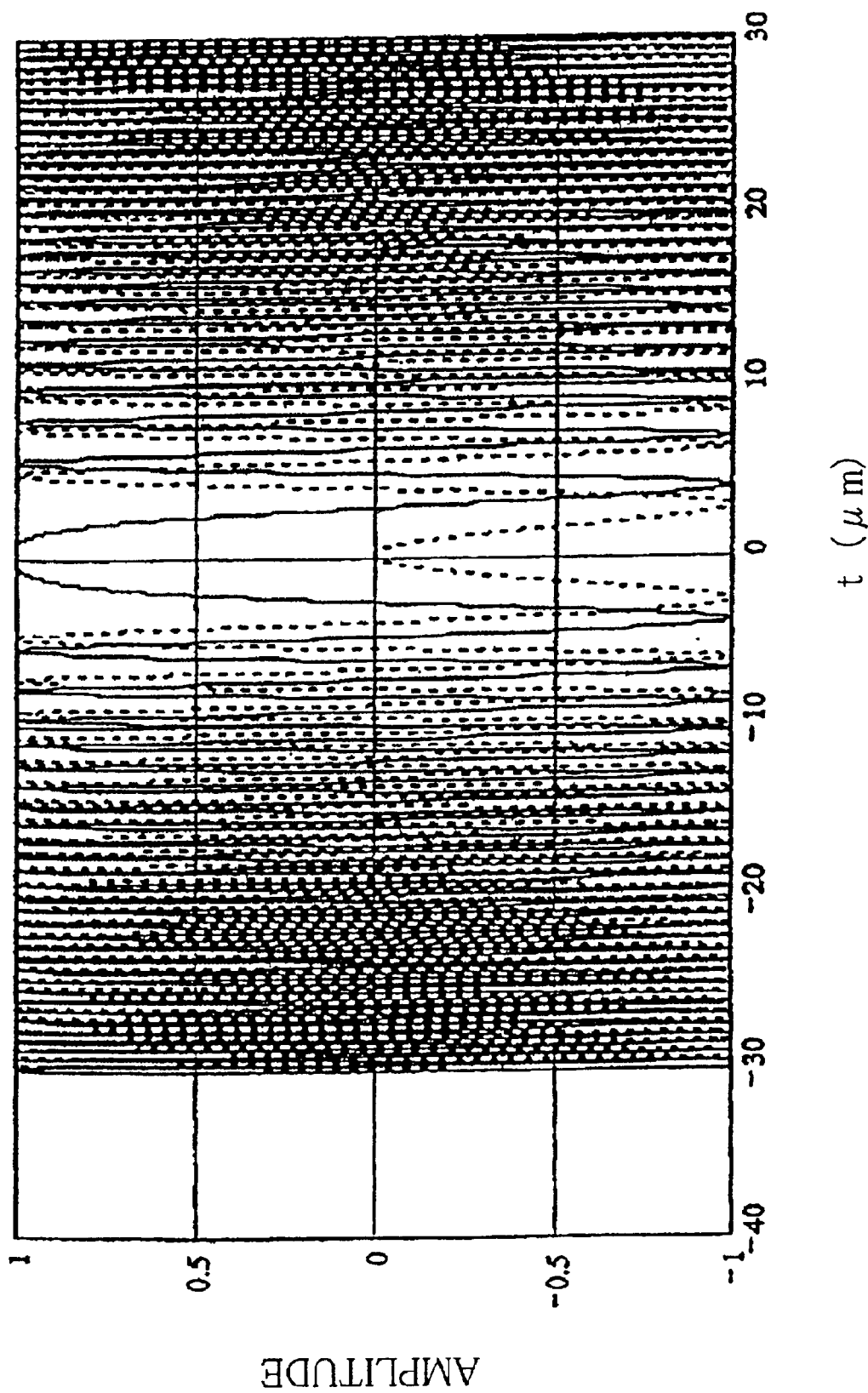
FIG. 9 is a graph, similar to the graph of FIG. 2, for the variable optical attenuator shown in FIG. 8.

In consequence, the inventor hereof found that the respective frequencies of sign inversion of the real and imaginary parts of the phase term were about 57 times, as shown in FIG. 9. It is anticipated, therefore, that the rotational symmetry of the diffraction pattern on the light receiving end face of the optical fiber will be ruined and that the polarization-dependent loss will increase.

To confirm this, the polarization-dependent loss for the prior art optical attenuator was measured. In doing this, a lens was provided on the light-connecting end face of the prior art optical fiber, so that the prior art structure may correspond to the embodiment structure. The space between the optical fibers was adjusted to 20 $\mu$m. The measurement result indicates that the polarization-dependent loss for the prior art example is great. When optical attenuation of 30 dB was achieved, for example, the polarization-dependent loss was about 0.75 dB.

Figure 10:
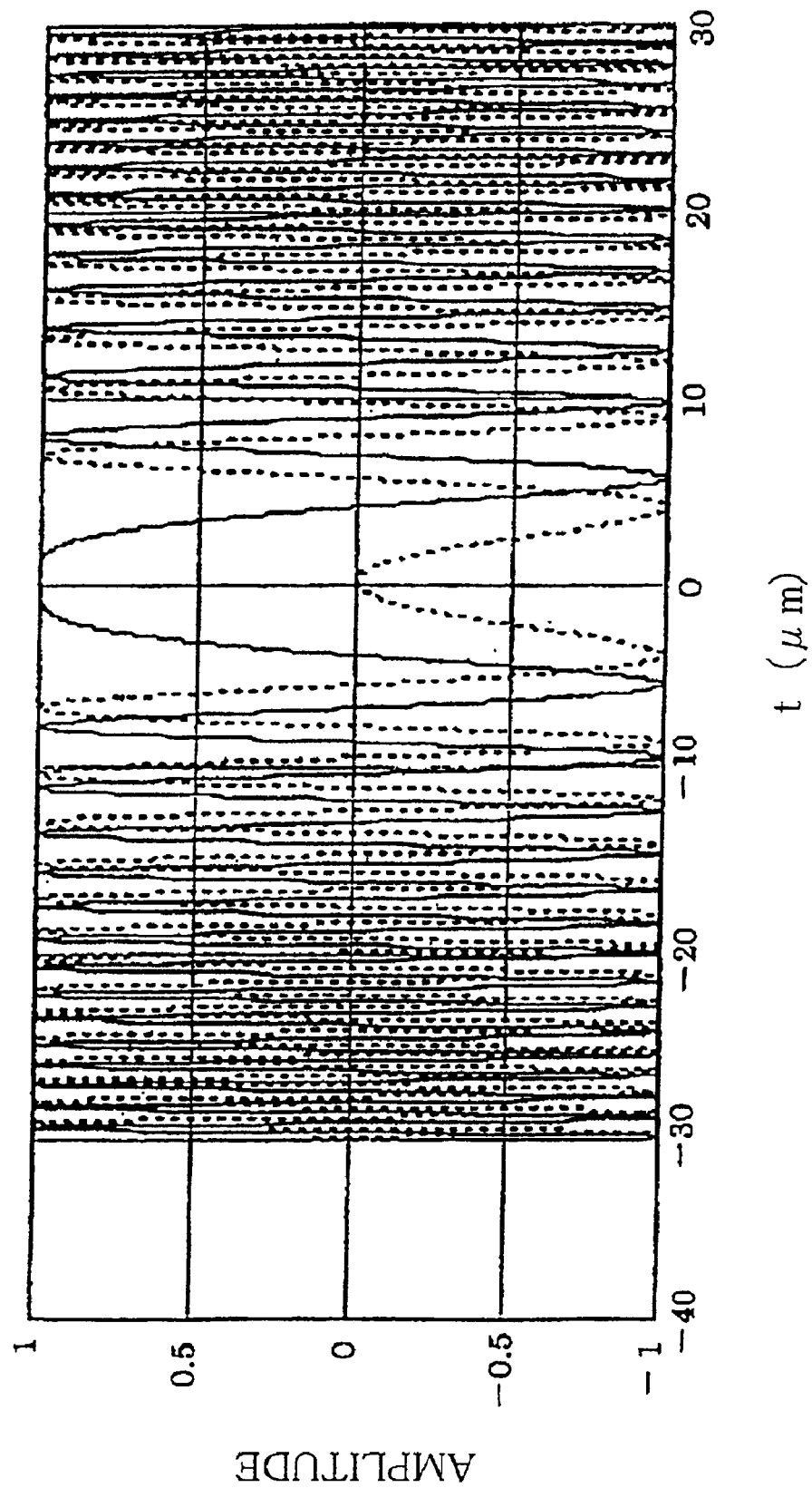
FIG. 10 is a graph, similar to the graph of FIG. 2, showing the relationship between the amplitude of an evaluation function and a distance $t$ from the coordinate origin, for the case where the optical fiber space in the variable optical attenuator shown in FIG. 8 is doubled.

When the optical fiber space for the prior art example was changed from 20 $\mu$m to 40 $\mu$m with the shutter plate between the optical fibers, moreover, the frequency of sign inversion of the phase term was calculated to be about 29 times, as shown in FIG. 10. Furthermore, the polarization-dependent loss with 30-dB optical attenuation was about 1.5 dB, which accounted for about 5% of the optical attenuation.

The following is a description of a variable optical attenuator according to a second embodiment of the invention.

The optical attenuator of the second embodiment is constructed substantially in the same manner as the one according to the first embodiment. The second embodiment differs from the first embodiment in the spaces between the first lens 7, shutter plate 5, and second lens 8.

More specifically, in the second embodiment, the space between the first and second lenses 7 and 8 is adjusted to 400 $\mu$m, and the shutter plate 5 is located between the two lenses in a manner such that the distance $z$ between the shutter plate 5 and the second lens 8 is 200 $\mu$m. Further, the mode-field radius $r$ of the propagating light on the second surface 5b of the shutter plate 5 is adjusted to 37.5 $\mu$m, as in the case of the first embodiment.

Figure 4:
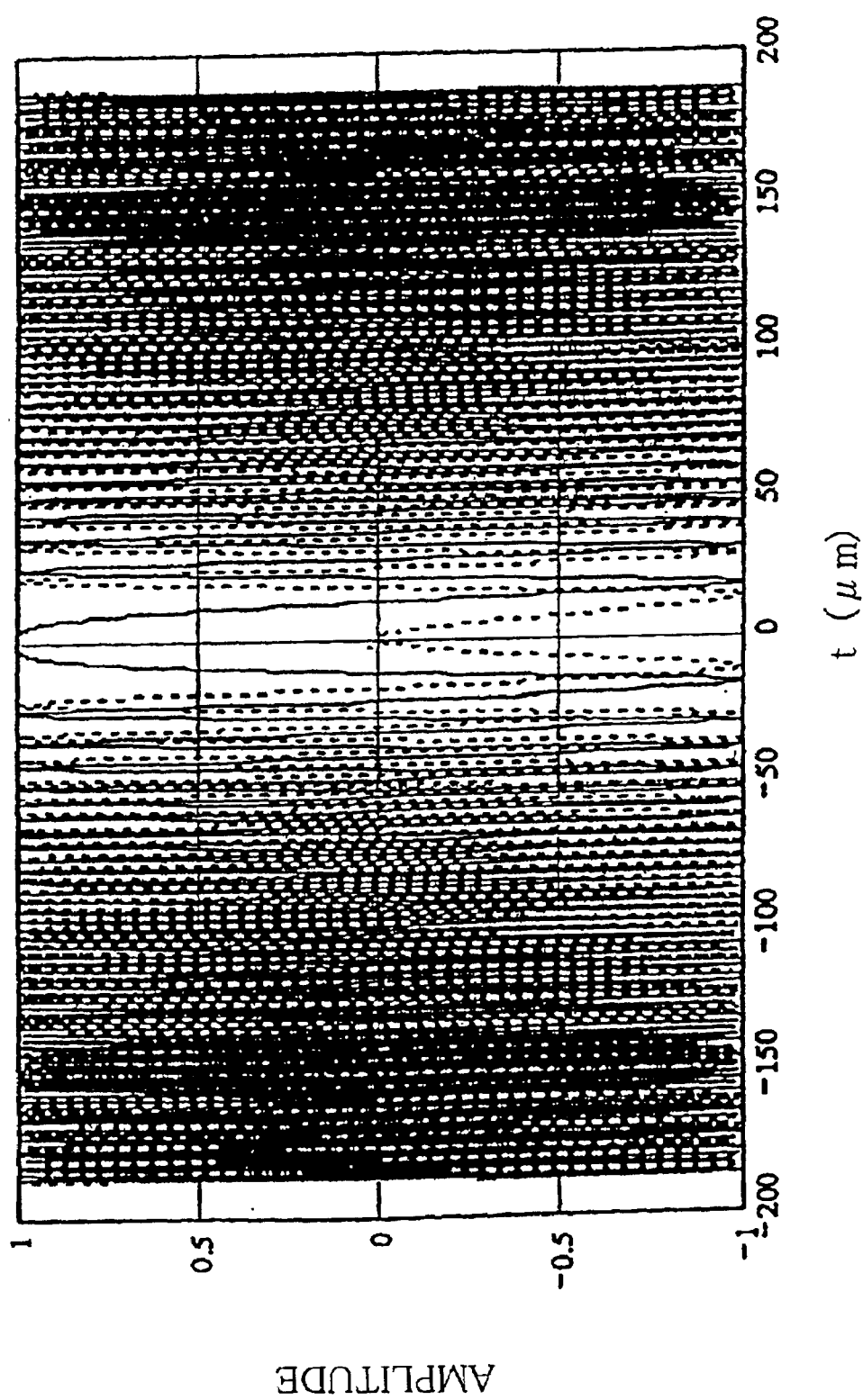
FIG. 4 is a graph, similar to the graph of FIG. 2, for variable optical attenuators according to second and fifth embodiments of the invention.

When the value of the phase term given by expression (2) was calculated with the variable $t$ in the phase term varied within the range from −5r to 5r, according to the second embodiment, it was found that the respective frequencies of sign inversion of the real and imaginary parts of the phase term were about 120 times, as indicated by full and broken lines, respectively, in FIG. 4.

According to the variable optical attenuator of the second embodiment, the polarization-dependent loss with 30-dB optical attenuation can be restricted to a very small value of 0.15 dB or less. Further, this optical attenuator can stand high optical input power, be small-sized, and accurately adjust the optical attenuation.

The following is a description of a variable optical attenuator according to a third embodiment of the invention.

The optical attenuator of the third embodiment is constructed substantially in the same manner as the ones according to the first and second embodiments except for the spaces between the first lens 7, shutter plate 5, and second lens 8.

More specifically, in the third embodiment, the space between the first and second lenses 7 and 8 is adjusted to 500 μm, and the shutter plate 5 is located between the two lenses in a manner such that the distance z between the shutter plate 5 and the second lens 8 is 250 μm. Further, the mode-field radius r of the propagating light on the second surface 5b of the shutter plate 5 is adjusted to 37.5 μm, as in the cases of the first and second embodiments.

Figure 5:
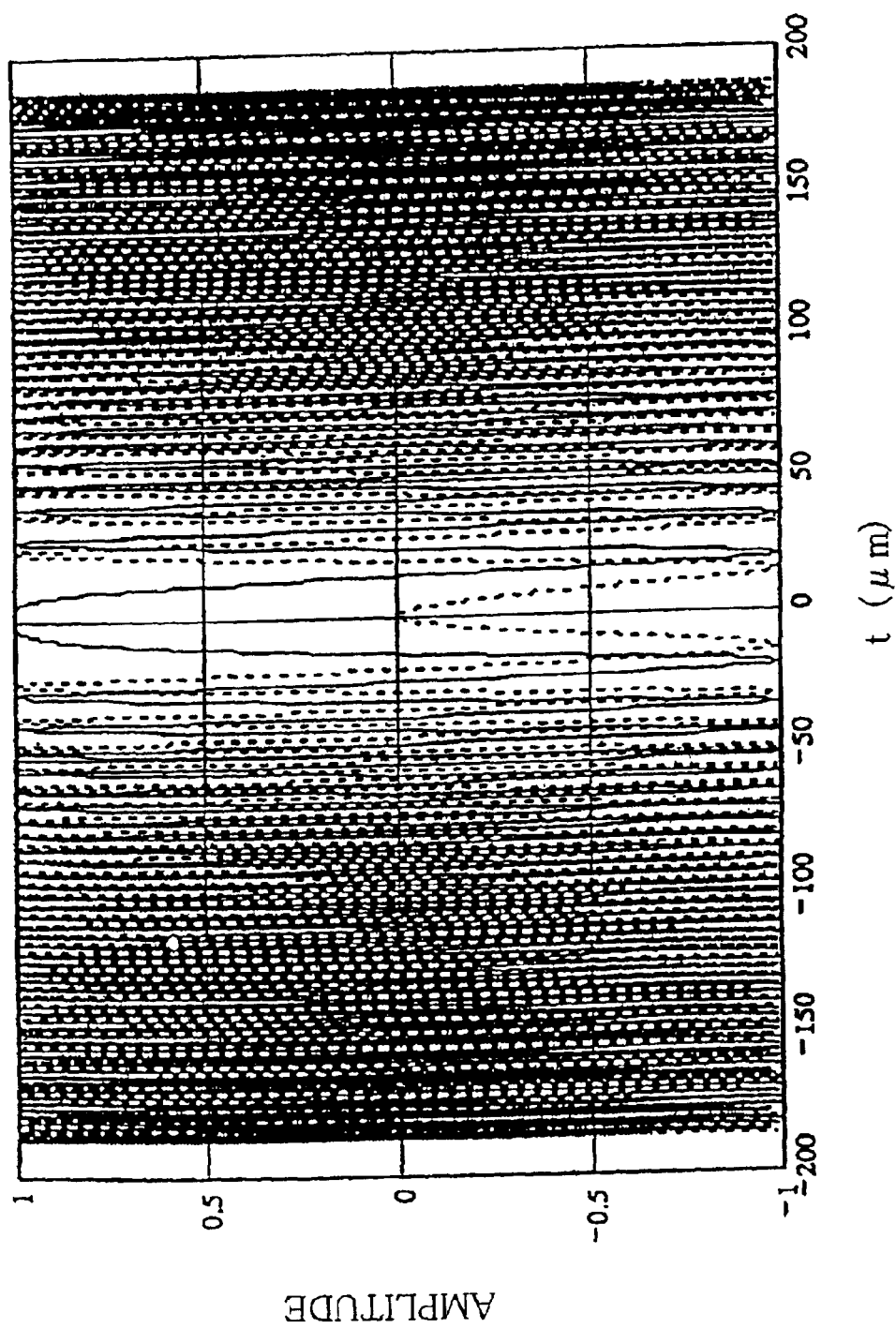
FIG. 5 is a graph, similar to the graph of FIG. 2, for a variable optical attenuator according to a third embodiment of the invention.

When the value of the phase term for the third embodiment was calculated, it was found that the respective frequencies of sign inversion of the real and imaginary parts of the phase term were about 92 times, as shown in FIG. 5.

The optical attenuator of the third embodiment has substantially the same effects of the ones according to the first and second embodiments. For example, the polarization-dependent loss with 30-dB optical attenuation is about 0.2 dB.

The following is a description of a variable optical attenuator according to a fourth embodiment of the invention.

Figure 6:
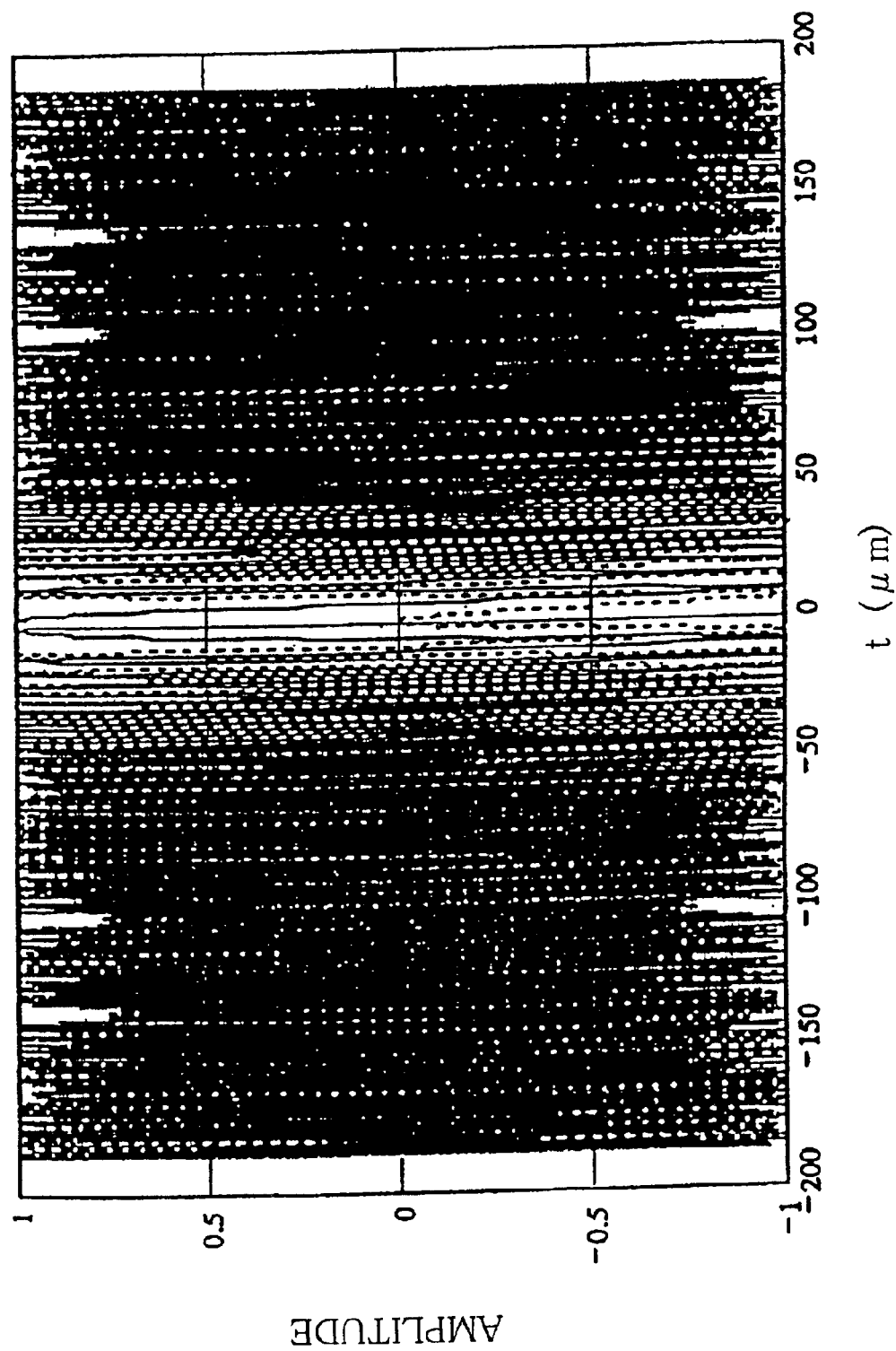
FIG. 6 is a graph, similar to the graph of FIG. 2, for a variable optical attenuator according to a fourth embodiment of the invention.

The optical attenuator of the fourth embodiment differs from the one according to the first embodiment in that the shutter plate 5 is located close to the second lens 8 so that the distance z between the shutter plate 5 and the second lens 8 is 50 μm. As shown in FIG. 6, the respective frequencies of sign inversion of the real and imaginary parts of the phase term are substantially the same as in the case of the first embodiment.

The following is a description of a variable optical attenuator according to a fifth embodiment of the invention.

In the optical attenuator of the fifth embodiment, the shutter plate 5 is located near first lens 7 so that the distance z between the shutter plate 5 and the second lens 8 ranges from about 197 to 198 μm. The frequencies of sign inversion of the phase term for the fifth embodiment are substantially the same as in the case of the second embodiment.

It is to be understood that the present invention is not limited to the first to fifth embodiments described above, and that various changes and modifications may be effected therein by one skilled in the art without departing from the scope or spirit of the invention.

For example, the spaces between the first lens 7, second lens 8, and shutter plate 5 are not limited to the dimensions for the foregoing embodiments, and can be freely set as long as the distance z and the mode-field radius r can be set so that the frequencies of sign inversion of the phase term are adjusted to a predetermined number of times, preferably to 60 times or more.

Figure 7:
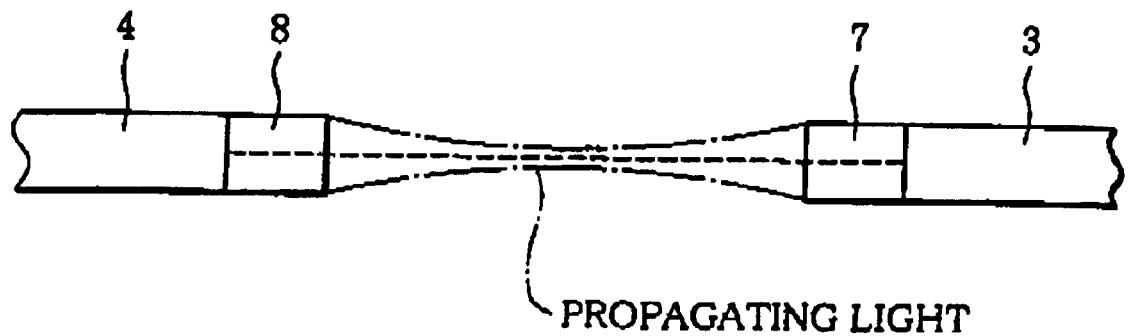
FIG. 7 is a view showing the relationship between propagating light and a shutter plate in a variable optical attenuator according to a modification of the invention.

In the foregoing embodiments, the first and second lenses 7 and 8 and the first and second optical fibers 3 and 4 form the collimators that can collimate the propagating light that propagates from the first lens 7 to the second lens 8. It is not essential, however, to use a lens for collimating the light. As shown in FIG. 7, for example, each of the first and second lenses 7 and 8 may be formed of a condenser. In this case, the mode-field radius r is settled depending on the respective focal lengths of the first and second lenses and changes according to the position in the Z-axis direction. If the propagating light is parallel as it propagates, on the other hand, the mode-field radius r is fixed in the direction of the optical axis Z.

In the foregoing embodiments, the first and second lenses 7 and 8 are connected to the respective light-connecting end faces of the first and second optical fibers 3 and 4 by fusing. However, the connection between the first lens 7 and the light-connecting end face of the first optical fiber 3 and the connection between the second lens 8 and the light-connecting end face of the second optical fiber 4 are not limited to fusing. For example, the first and second lenses 7 and 8 may be coupled optically to the respective light-connecting end faces of the first and second optical fibers 3 and 4 with spaces between them.

In the foregoing embodiments, each of the first and second lenses 7 and 8 is formed of a lens-type optical fiber. Alternatively, it may be formed of a lens of any other type.

In the foregoing embodiments, the shutter plate 5 is moved by means of the comblike actuator 6 that utilizes electrostatic force. Alternatively, the shutter plate 5 may be moved by means of the electromagnetic force of a micro electromagnet that is formed by using semiconductor micro-machining technique, for example.

In the foregoing embodiments, the first and second optical components are formed of the first and second optical fibers 3 and 4, respectively. Alternatively, they may be formed of any other optical components than optical fibers.

What is claimed is:

1. An optical attenuator comprising:
   a first optical component;
   a second optical component opposed to the first optical component across a space;
   a shutter plate for intercepting at least part of propagating light propagating from the first optical component to the second optical component;
   a first lens provided on a light-connecting end face of the first optical component; and
   a second lens provided on a light-connecting end face of the second optical component,
   a distance between the shutter plate and the second lens and a mode-field radius of the propagating light on a second-lens-side surface of the shutter plate being set so that respective signs of real and imaginary parts of an evaluation function, representing a diffraction pattern of the propagating light as a function of at least the distance and a coordinate value in a coordinate system set in the optical attenuator, are inverted a given number of times settled depending on required properties for the optical attenuator or more frequently when the coordinate value, serving as a variable of the evaluation function, is changed within an evaluation range defined according to at least the mode-field radius.

2. The optical attenuator according to claim 1, wherein said distance is the distance between the second-lens-side surface of the shutter plate and a shutter plate-side surface of the second lens.

3. The optical attenuator according to claim 1, wherein said coordinate system is a three-dimensional rectangular coordinate system set so that an origin of coordinates thereof is coincident with a point of intersection of an optical axis of the propagating light and a plane containing the second-lens-side surface of the shutter plate.

4. The optical attenuator according to claim 3, wherein said range of evaluation has a width five times as great as the mode-field radius with respect to one of the coordinate axes of the coordinate system.

5. The optical attenuator according to claim 1, wherein said given number of times is not lower than 60.

6. The optical attenuator according to claim 5, wherein said given number of times is not lower than 100.

7. The optical attenuator according to claim 1, wherein said evaluation function is a phase term included in an integrand in a Fresnel-Kirchhoff integral representative of a diffraction pattern of the propagating light, the phase term being an exponential function represented as a function of a wavelength of the propagating light, the distance, and the coordinate value.

8. The optical attenuator according to claim 7, wherein said phase term is an exponential function represented as a function of a position on a coordinate axis perpendicular to an optical axis of the propagating light in the coordinate system, the wavelength, and the distance.

9. The optical attenuator according to claim 1, wherein at least said shutter plate and said second lens are arranged so that the distance between the shutter plate and the second lens is adjusted to a set distance, and light of a characteristic such that the mode-field radius is adjusted to a set mode-field radius is used as incident light to the first optical component or said first and second lenses are formed of lenses with focal lengths such that the mode-field radius is adjusted to the set mode-field radius.

10. The optical attenuator according to claim 9, wherein said incident light is a Gaussian beam.

11. The optical attenuator according to claim 1, wherein at least one of said first and second lenses is formed of a lens-type optical fiber including a lens mechanism and is connected to the light-connecting end face of the first or second optical component corresponding thereto.

12. The optical attenuator according to claim 1, wherein respective light-connecting end portions of said first and second optical components and said first and second lenses are fixed on a semiconductor substrate.

13. The optical attenuator according to claim 1, wherein at least one of said first and second optical components is formed of an optical fiber.

14. The optical attenuator according to claim 1, which further comprises an actuator, and wherein said shutter plate is coupled to the actuator and located so as to be movable in a direction perpendicular to the optical axis of the propagating light, and an amount of optical attenuation of the propagating light by means of the shutter plate is changed by moving the shutter plate by means of the actuator.

15. The optical attenuator according to claim 14, wherein said shutter plate and said actuator are formed on a semiconductor substrate.

* * * * *